(12) United States Patent
Vargas et al.

(10) Patent No.: US 11,797,818 B2
(45) Date of Patent: Oct. 24, 2023

(54) INFORMATION-SHIELDING CARDS AND SYSTEMS AND METHODS FOR FABRICATING THE SAME

(71) Applicant: Capital One Services, LLC, McLean, VA (US)

(72) Inventors: Cruz Vargas, Alexandria, VA (US); Bryant Yee, Washington, DC (US); Latika Gulati, Annandale, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 115 days.

(21) Appl. No.: 17/362,483

(22) Filed: Jun. 29, 2021

(65) Prior Publication Data
US 2022/0414413 A1  Dec. 29, 2022

(51) Int. Cl.
| G06K 19/02 | (2006.01) |
| G06K 19/077 | (2006.01) |
| B42D 25/387 | (2014.01) |
| G06K 19/14 | (2006.01) |

(52) U.S. Cl.
CPC ..... *G06K 19/07722* (2013.01); *B42D 25/387* (2014.10); *G06K 19/07749* (2013.01); *G06K 19/14* (2013.01)

(58) Field of Classification Search
CPC ........... G06K 19/07722; G06K 7/1417; G06K 19/0723; G06K 19/06196; G06K 19/06046; G06K 7/10732; G06Q 20/34; G06Q 20/352

USPC ......................................... 235/488, 487, 492
See application file for complete search history.

(56) References Cited

U.S. PATENT DOCUMENTS

| 6,749,123 | B2 | 6/2004 | Lasch et al. |
| 7,306,158 | B2 | 12/2007 | Berardi et al. |
| 7,654,581 | B2 | 2/2010 | Cruikshank et al. |
| 8,413,894 | B2 | 4/2013 | Bona et al. |
| 9,065,893 | B2 | 6/2015 | Glaser |
| 9,519,770 | B2 | 12/2016 | Voice et al. |
| 10,380,476 | B1 * | 8/2019 | Vittimberga ............... B32B 5/30 |
| 10,679,113 | B2 * | 6/2020 | Herslow .................. B32B 27/12 |
| 11,230,136 | B1 * | 1/2022 | Legge ..................... G07D 7/121 |

FOREIGN PATENT DOCUMENTS

| JP | 2021092880 | * 6/2021 | ............. G06K 19/06 |
| WO | 2004/053786 | 6/2004 | |

* cited by examiner

*Primary Examiner* — Daniel St Cyr
(74) *Attorney, Agent, or Firm* — HUNTON ANDREWS KURTH LLP

(57) ABSTRACT

Example embodiments of information-shielding cards and systems and methods of fabricating the same are provided. An information-shielding card can comprising a substrate comprising a first layer, a second layer, a third layer, a chip embedded in the second layer, and a quick-response (QR) code formed on the second layer. The second layer can be disposed between the first layer and the third layer. The first layer can comprise a first material that is transparent when exposed to a non-visible light, the second layer can comprise a second material that is opaque when exposed to visible light and when exposed to non-visible light, and the third layer comprises a third material that is transparent when exposed to a non-visible light.

20 Claims, 13 Drawing Sheets

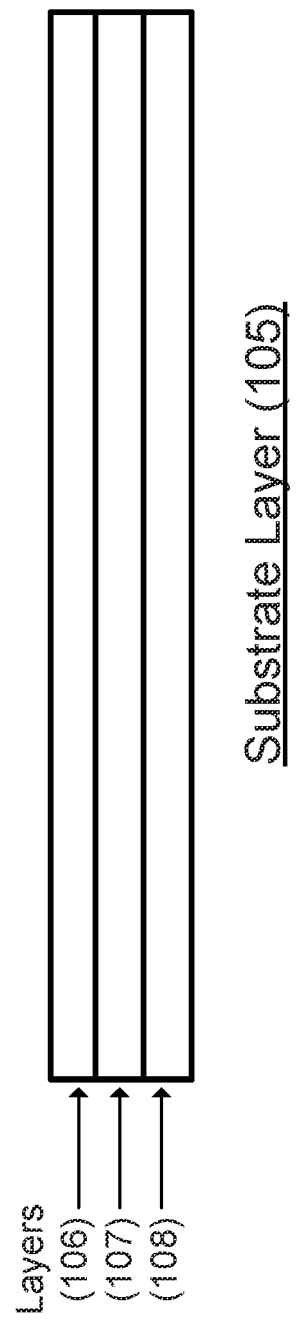

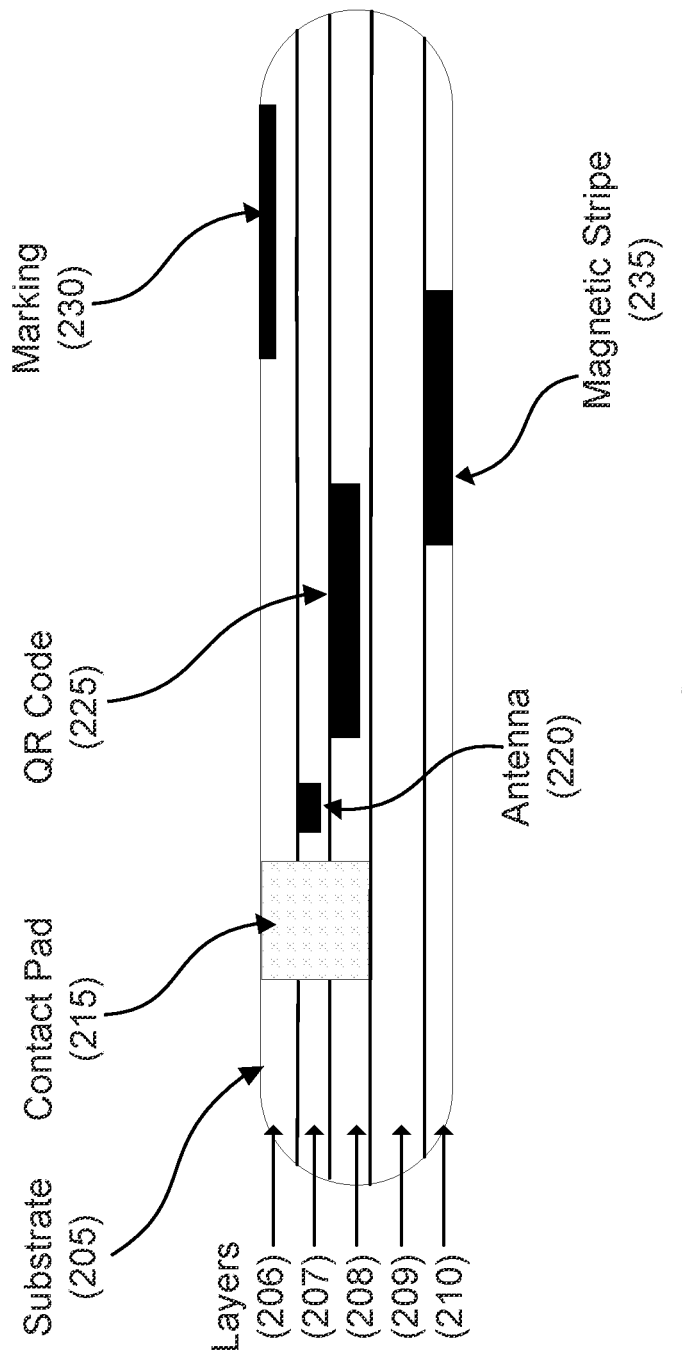

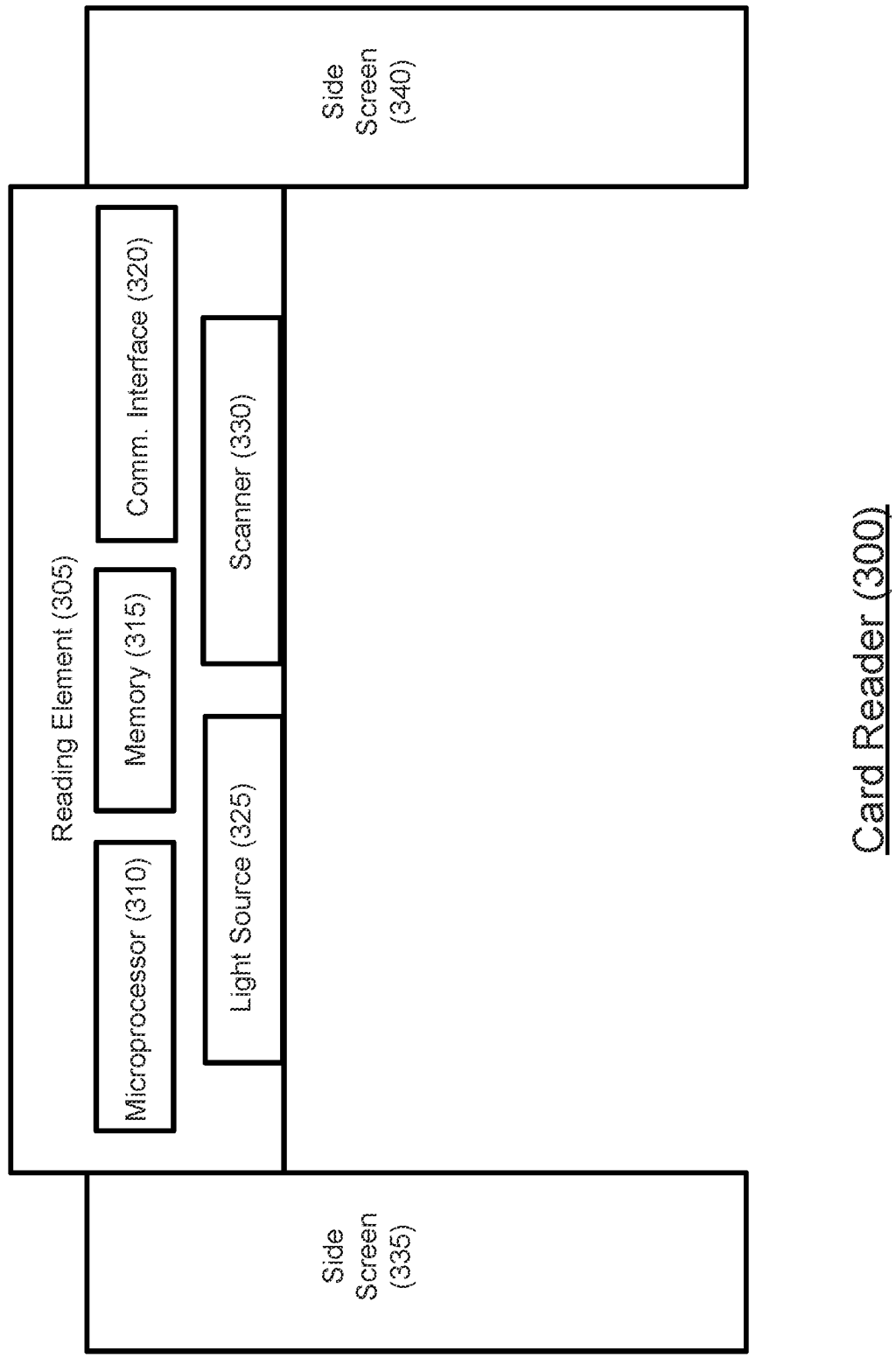

Method (500)

US 11,797,818 B2

INFORMATION-SHIELDING CARDS AND SYSTEMS AND METHODS FOR FABRICATING THE SAME

FIELD OF THE INVENTION

The present disclosure relates to information-shielding cards, such as information-shielding payment cards, and to systems and methods for fabricating information-shielding cards.

BACKGROUND

Card-based transactions have become highly common, and card-based transactions are increasing in volume and in variety. Currently, cards can be used for a range of transactions, including payment transactions and identity verification transactions.

Accordingly, consumers will often carry a several cards used for a variety of purposes. Cards that frequently carried cards include credit cards, debit cards, and identification cards. Consumers may prefer to use certain cards in certain situations, such as credit or debit cards for payment transactions, for reasons of convenience, to earn rewards based on spending, to better track spending online or through the receipt of monthly statements, or to avoid carrying significant amounts of cash. Consumers may also be required to carry other cards in certain situations, such as a driver's license while driving or an identification card when seeking access to a restricted area.

As the use of cards and the variety of card-based transactions will continue to expand as well, the risks attendant to the use of cards also increases. These risks can include fraud and identity theft, and these risks can be highly problematic for both consumers and card-issuing entities.

These and other deficiencies exist. Accordingly, there is a need for a card that can be used in a secure manner for a high volume of transactions and a high variety of transactions.

SUMMARY

Aspects of the present disclosure include information-shielding cards, such as payment and identification cards, and systems and methods for fabricating information-shielding cards. Various embodiments describe durable, inexpensive information-shield cards composed of light-sensitive and non-light-sensitive materials.

Embodiments of the present disclosure provide a card, comprising: a substrate comprising a first layer, a second layer, and a third layer, wherein the second layer is disposed between the first layer and the third layer; a chip embedded in the second layer; and a quick-response (QR) code formed on the second layer, wherein: the first layer comprises a first material that is transparent when exposed to a non-visible light, the second layer comprises a second material that is opaque when exposed to visible light and when exposed to non-visible light, and the third layer comprises a third material that is transparent when exposed to a non-visible light.

Embodiments of the present disclosure provide a method of fabricating a card, comprising: laminating a first layer onto a first side of a second layer; embedding a chip within the first layer and the second layer laminating a third layer onto a second side of the second layer, wherein the second side of the second layer is opposite of the first side, wherein: the first layer comprises a first material that is transparent when exposed to a non-visible light, the second layer comprises a second material that is opaque when exposed to visible light and when exposed to non-visible light, and the third layer comprises a first material that is transparent when exposed to a non-visible light.

Embodiments of the present disclosure provide a card, comprising: a substrate comprising a first layer, a second layer, and a third layer, wherein the second layer is disposed between the first layer and the third layer; a chip embedded in the second layer; a quick-response (QR) code formed on the second layer; an opaque security layer disposed upon the first layer, wherein the opaque security layer comprises: one or more opaque segments having a first orientation and a second orientation, and a switch configured to move the one or more segments between the first orientation and the second orientation; and wherein: the first layer comprises a first material that is transparent when exposed to a non-visible light, the substrate layer comprises a second material that is opaque when exposed to visible light and when exposed to non-visible light, and the third layer comprises a third material that is transparent when exposed to a non-visible light.

Further features of the disclosed design, and the advantages offered thereby, are explained in greater detail hereinafter with reference to specific example embodiments illustrated in the accompanying drawings.

BRIEF DESCRIPTION OF THE DRAWINGS

Various embodiments of the present disclosure, together with further objects and advantages, can best be understood by reference to the following description taken in conjunction with the accompanying drawings.

FIG. 1C is an illustration of a card according to an example embodiment.

FIG. 2A is an illustration of a card according to an example embodiment.

FIG. 3A is an illustration of a card reader according to an example embodiment.

DETAILED DESCRIPTION OF EXAMPLE EMBODIMENTS

Figure 1A:
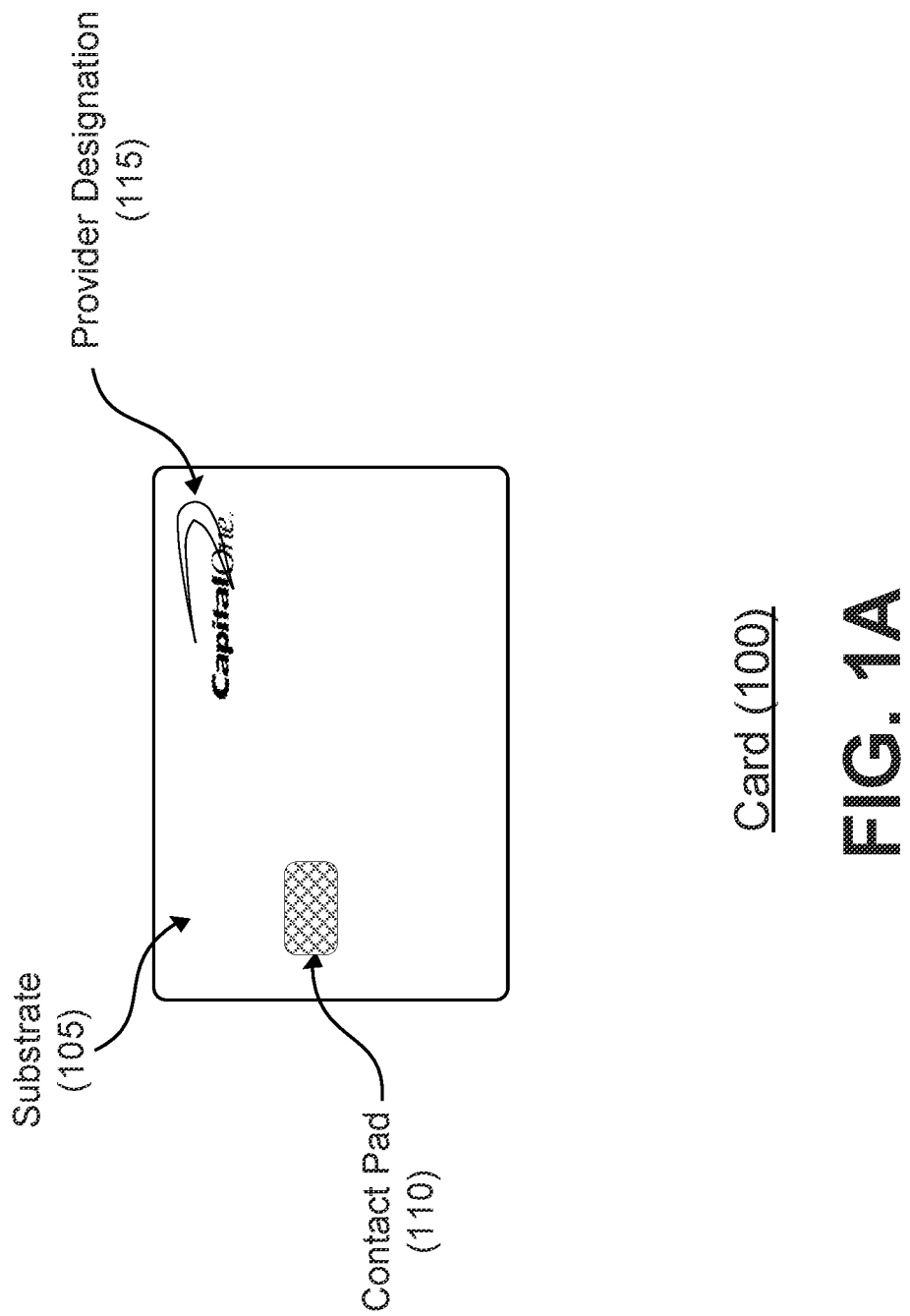
FIG. 1A is an illustration of a card according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Example embodiments described herein are directed to information-shielding cards and systems and methods for fabricating information-shielding cards. Information-shielding cards according to example embodiments can be exclusively formed, or partially formed, of materials that are light-sensitive. These light-sensitive materials may compose one or more layers of the card substrate, and these layers themselves, or other layers of the substrate, may contain private information that is shielded from view by the light-sensitive materials that appear opaque when exposed to certain types of light, such as visible light. When exposed to other forms of light, such as non-visible light, the light-sensitive materials may appear transparent or translucent, and reveal the private information either completely or to a varying degree. By avoiding visible light and other common light wavelengths, security can be increased and the risk of inadvertent disclosure of private information or fraud can be decreased.

Information-shielding cards according to example embodiments can include other security features, used in conjunction with or in lieu of the light-sensitive materials. For example, information-shielding cards can include one or more security layers, each of which can be composed of one or more segments. These segments can be opaque and function to block private information from view in certain orientations and expose the private information in other orientations. In other examples, the segments can be light-sensitive in the same way as other light-sensitive materials used in the card or in different ways. The segments can be manipulated by a physical switch, an electronic switch, or other switches. The switches can be manually manipulated, manipulated in response to an electrical signal, or manipulated or moved in other ways.

Information-shielding cards according to example embodiments can provide numerous benefits. For example, information-shielding cards can reduce the risk that private information will be inadvertently exposed or stolen. This can promote privacy and reduce the risks that users, merchants, and card-issuing entities incur when users engage in card-based transaction. For example, information-shielding cards can reduce the risk that private information can be manually stolen (e.g., manually viewed or copied), electronically stolen (e.g., by a camera, a card reader, a card sniffer), and otherwise intercepted during a card-based transaction. Stolen private information imposes significant costs on users, merchants, and card-issuing entities, including the financial costs and expenditures of other resources on preventing, investigating, and remedying fraud.

Stolen information can also reduce confidence of users, merchants, and card-issuing entities in card-based transactions, and accordingly, information-shielding cards can promote further use of cards in both current and new transactions. Users, merchants, and card-issuing entities can be encouraged to engage more frequently in card-based transactions and expand the range of card-based transactions, if privacy and security are increased.

Information-shielding cards are not limited to a particular type of private information, and information-shielding cards can be used to shield a variety of private information for a variety of purposes. The use of information-shielding cards for a variety of purposes can streamline the materials acquisition and manufacturing processes, which can reduce costs for users, merchants, and card-issuing entities.

Example embodiments of information-shielding cards can include private information that is machine-readable, such as a QR code or other machine-readable code. By using a machine-readable code instead of a human-readable account number, privacy and security of the private information associated with the machine-readable code can be further increased and the risk of inadvertent or unauthorized disclosure and fraud can be further decreased. FIG. 1A illustrates a front view of an example embodiment of card 100, which can comprise, for example, a payment card, such as a credit card, debit card, or gift card, an identification card, such as a driver's license or a club membership card, or an access point entry card. As shown in FIG. 1A, the card 100 can comprise a substrate 105, a contact pad 110, and one or more other markings, such as a provider designation 115. In some examples, the card 100 may have certain physical characteristics compliant with the ID-1 format of the ISO/IEC 7810 standard, and the card may otherwise be compliant with the ISO/IEC 14443 standard. However, it is understood that the card 100 according to the present disclosure may have different characteristics, and the present disclosure does not require compliance with a standard.

The substrate 105 can comprise one or more light-sensitive materials. As described herein, a light-sensitive material that can comprise, in whole or in part, a light-sensitive layer, is any material that differs in opacity in response to exposure to electromagnetic radiation, such as visible light, ultraviolet (UV) light (e.g., UVA, UVB, UVC, black light), infrared (IR) light, radio waves, microwaves, and gamma rays. Light-sensitive materials described herein may range in opacity from completely opaque to partially opaque (i.e., translucent), to fully transparent, depending upon the type, concentration, and spectrum of the electromagnetic radiation applied. While reference can be made to particular types of electromagnetic radiation (e.g., visible light versus non-visible light) it is understood that the present disclosure is not limited thereto. Light-sensitive materials include, without limitation, plastics, ceramics, glasses, coated or doped materials, UV or IR transparent compounds, and radiopaque fillers, and any combination thereof. Exemplary light-sensitive materials can include, without limitation, materials, such as plastics, ceramics, or glass, coated or doped with metal oxides (e.g., titanium dioxide, zinc oxide), radiopaque fillers (e.g., barium sulfate), UV or IR transparent compounds (e.g., acrylic, silicon, quartz, barium fluoride, potassium bromide, cadmium telluride, gallium arsenide, IR or UV grade fused silica, schott glass, IR plastic), and any combination thereof.

In some examples, the light-sensitive materials can have a varying opacity and be configured to obscure some or all of what is below. In some examples, the light-sensitive materials can be completely opaque, transparent, or translucent, and reveal what is underlying the light-sensitive materials either completely or to a varying degree. In some examples, the opacity of the light-sensitive materials can vary based on the one or more of the underlying materials (e.g., the thickness of the underlying materials, the type and degree of light-sensitivity of the underlying materials), the nature of any information placed on the underlying materials (e.g., private information), and the method of placing the information on the underlying materials (e.g., printing, burning, painting, embossing, engraving, size of the information, the relative contrast between the information and the layers).

As further described herein, a non-light-sensitive material lacks one or more of the properties of a light-sensitive materials. Exemplary materials comprising non-light-sensitive layer include, without limitation, polyvinyl chloride, polyvinyl chloride acetate, acrylonitrile butadiene styrene, polycarbonate, polyesters, anodized titanium, palladium, gold, carbon, paper, biodegradable materials, and any combination thereof.

The substrate 105 can include a single layer or several layers laminated together and the layers can include one or more light-sensitive materials. If the substrate 105 comprises multiple layers, sheets of material can be fed to a laminating press in order to laminate the layers together. In some examples, each layer of substrate 105 can comprise the same or different light-sensitive materials and portions or regions of each layer can have a varying degree of light-sensitivity.

For example, the substrate 105 can comprise one or more non-light-sensitive layers and one or more of light-sensitive layers arranged on each side of the non-light-sensitive layers. The one or more non-light-sensitive layers can have private information, such as an account number or QR code, printed thereon. The one or more light-sensitive layers can be opaque to visible light, for example, concealing the private information on the one or more non-light-sensitive layers until the application of a certain type of light or radiation, such as non-visible light is applied, which can reveal the information.

The contact pad 110 can be embedded in the substrate 105, for example, in one or more of the light-sensitive layers and/or in one or more of the non-light-sensitive layers. The contact pad 110 can comprise a chip, processing circuitry, an antenna, and other components, and additional details on the contact pad are provided with reference to FIG. 2C.

The one or more other markings on the card, shown as provider designation 115 in FIG. 1A, or, can include an identification of the card-issuing entity, such as a financial institution or other corporation, or a government entity. These markings would not include private information, however, in some circumstances it can be advantageous to identify the card-issuing entity or provide other non-private information, such as a phone number to call for assistance or in the event a lost card has been found. It is understood that these markings are exemplary and the present disclosure is not limited to these markings. In some examples, the card 100 can include these markings, image-based markings (e.g., a photograph and a logo), or other markings. The markings can be applied to the substrate 105 by, e.g., painting, inks, or other marking materials, by printing, burning, etching, engraving, embossing, painting, or any combination thereof. In some examples, the provider designation 115 or one or more other markings can be omitted.

In the example embodiment illustrated in FIG. 1A, the substrate 105 can be composed of one or light-sensitive material layers placed on or around one or more a non-light-sensitive material layers having private information printed thereon (e.g., a QR code). The light-sensitive material layers can be opaque when exposed to visible light and transparent when exposed to non-visible light, such as UV light or IR light, causing the private information to be revealed. In some examples, the light-sensitive material layers can reveal the information when exposed to other radiation, such as radio waves, microwaves, and gamma rays. The illustration of FIG. 1A shows the appearance of the card 100 when exposed to visible light.

Figure 1B:
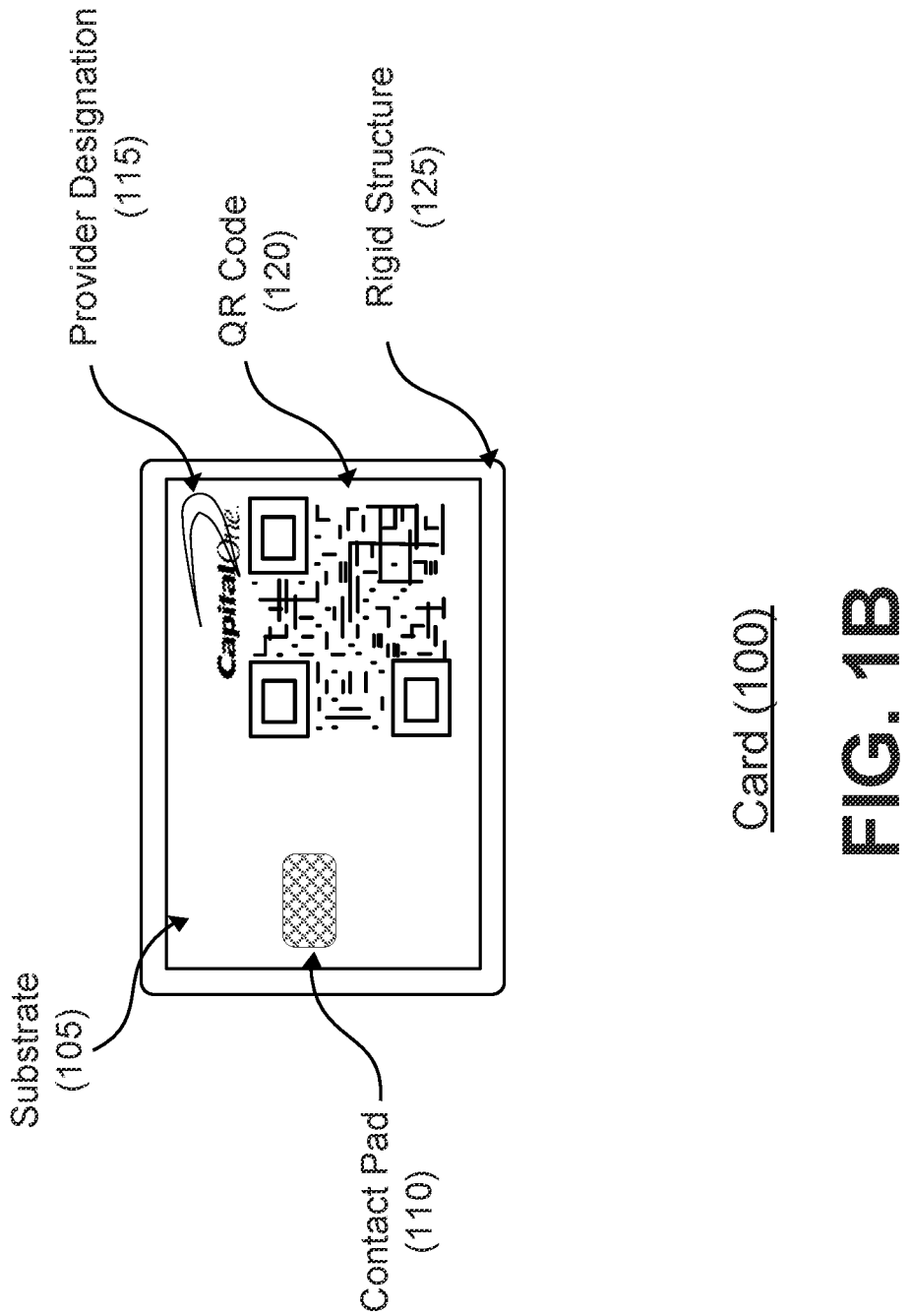
FIG. 1B is an illustration of a card according to an example embodiment.

FIG. 1B is illustrates a front view of an example embodiment of card 100 and includes substrate 105, contact pad 110, and one or more markings (shown as provider designation 115). FIG. 1B illustrates the card 100 when exposed to non-visible light, such as UV light or IR light, or other radiation, such as radio waves, microwaves, and gamma rays.

One or more of the non-light-sensitive layers of the substrate 105 can have a QR code 120 printed, painted, burned, etched, engraved, embossed, or otherwise placed thereon. When a non-visible light is exposed to the one or more light-sensitive layers within substrate 105, the QR code 120 and other information on the non-light-sensitive layers of the substrate 105 can be revealed, as shown in FIG. 1B. For example, exposure to a concentrated UV light can cause the QR code 120 and other information to be revealed. In other examples, IR light, or other radiation, such as radio waves, microwaves, and gamma rays, can cause the QR code 120 and other information to be revealed.

The QR code 120 can be a quick-response code. The QR code 120 can be a two-dimensional bar code that can encode information and can be machine-readable. For example, the QR code 120 can consist of black squares arranged in a square grid on a non-black background (e.g., white, another non-black color, or clear) using four standardized encoding modes (numeric, alphanumeric, byte/binary, and kanji) to store data, which can be read or scanned by card reading devices having a camera and the application disclosed herein.

FIG. 1B also illustrates a rigid structure 125, which can be composed of light-sensitive and/or non-light-sensitive materials. The rigid structure 125 can provide structural rigidity to the substrate 105, particularly when the substrate 105 comprises a plurality of layers. The rigid structure 125 can improve and maintain the integrity of the card 100 and across the one or more layers forming the substrate 105 during normal use and handling, including swiping and insertion of the card 100 into card reading devices. In some examples, an antenna can be contained within the rigid structure 125.

Once the QR code 120 and other information on the non-light-sensitive layers of the substrate 105 is revealed, and the QR code 120 and other information can be scanned by a card scanning device. This allows for a transaction involving the card to take place. For example, the QR code 120 can be linked an account associated with the card 100 or with a user associated with the card 100. The QR code 120 can store and, when scanned, provide, account information, identification information, user verification or second-factor verification, or other information necessary for a transaction to take place.

FIG. 1C is illustrates a side view of an example embodiment of card 100. As shown in FIG. 1C, substrate 105 can be composed of a plurality of layers 106, 107, and 108. While FIG. 1C illustrates three layers, it is understood that substrate 105 can be comprised of any numbers of layers.

The layer 106 can be disposed on one side of layer 107. In some examples, the layer 106 can be disposed on a side of the layer 107 that is opposite of the layer 108. In some examples, the layer 106 can be a light-sensitive layer. Accordingly, when exposed to UV light, IR light, or other radiation, such as radio waves, microwaves, and gamma rays, information printed beneath the layer 106 can be revealed.

The layer 107 can be a non-light-sensitive layer, and the layers 106 and 108 can be disposed on opposite sides of the layer 107. Information, including private information such as QR code 120 or an account number, can be printed, burned, etched, engraved, embossed, painted, or otherwise placed on layer the 107. Accordingly, when the layer 106 and/or the layer 108 is exposed to UV light, IR light, or other radiation, such as radio waves, microwaves, and gamma rays, the information on layer the 107 beneath the layer 106 and/or the layer 108 can be revealed.

In some examples, the layers 106 and 108 can be the same light-sensitive materials, and in other examples, the layers 106 and 108 can be different materials having the same light-sensitive properties. This advantageously allows a card reader to apply the same light, such as non-visible light (e.g., UV light, IR light, or other radiation) to both the layers 106 and 108 in order to reveal the information printed on either side of the layer 107. Alternatively, for added security, the layers 106 and 108 can be different light-sensitive materials, such that a card reader is required to apply a different light, such as a different non-visible light, to either of the layers 106 and 108 in order to reveal the information printed on either side of layer 107.

FIG. 2A illustrates a side view of an example embodiment of card 200. FIG. 2A can reference the same or similar components as FIGS. 1A-1C as described herein but is not limited thereto.

As shown in FIG. 2A, the card 200 can include a substrate 205 a plurality of layers 206, 207, 208, 209, and 210, a contact pad 215, an antenna 220, a QR code 225, a marking 230, and a magnetic stripe 235. The plurality of layers 206, 207, 208, 209, and 210 can comprise a plurality of light-sensitive layers and non-light-sensitive layers.

The layers 206 and 207 can be light-sensitive layers comprising light-sensitive materials. Exemplary light-sensitive materials include, without limitation, plastics, ceramics, glasses, coated or doped materials, UV or IR transparent compounds, and radiopaque fillers, and any combination thereof. Exemplary light-sensitive materials can include, without limitation, materials, such as plastics, ceramics, or glass, coated or doped with metal oxides (e.g., titanium dioxide, zinc oxide), radiopaque fillers (e.g., barium sulfate), UV or IR transparent compounds (e.g., acrylic, silicon, quartz, barium fluoride, potassium bromide, cadmium telluride, gallium arsenide, IR or UV grade fused silica, schott glass, IR plastic), and any combination thereof.

The layer 208 can be a non-light-sensitive layer comprising non-light-sensitive materials. Exemplary non-light-sensitive layer include, without limitation, polyvinyl chloride, polyvinyl chloride acetate, acrylonitrile butadiene styrene, polycarbonate, polyesters, anodized titanium, palladium, gold, carbon, paper, biodegradable materials, and any combination thereof.

The layers 209 and 210 can be light-sensitive layers comprising light-sensitive materials. Exemplary light-sensitive materials include, without limitation, plastics, ceramics, glasses, coated or doped materials, UV or IR transparent compounds, and radiopaque fillers, and any combination thereof. Exemplary light-sensitive materials can include, without limitation, materials, such as plastics, ceramics, or glass, coated or doped with metal oxides (e.g., titanium dioxide, zinc oxide), radiopaque fillers (e.g., barium sulfate), UV or IR transparent compounds (e.g., acrylic, silicon, quartz, barium fluoride, potassium bromide, cadmium telluride, gallium arsenide, IR or UV grade fused silica, schott glass, IR plastic), and any combination thereof.

The contact pad 215 can be embedded in substrate 205, for example, in one or more of the light-sensitive layers and/or in one or more of the non-light-sensitive layers. As shown in FIG. 2A, the contact pad 215 can be embedded in the layers 206, 207, and 208. The contact pad 215 can comprise a chip, processing circuitry, an antenna, and other components, and additional details on the contact pad are provided with reference to FIG. 2C.

The antenna 220 can be embedded within one or more layers of the substrate 205 (e.g., within layer 207 as shown in FIG. 2A) and around the contact pad 215. For example, the antenna 220 can be integral with the contact pad 215 and can be used with an external booster coil. As another example, the antenna 220 can be external to the contact pad 215. The antenna 220 can support data communication and power harvesting with external devices via short-range wireless communications, such as near field communication, radio-frequency identification, Bluetooth®, and Wi-Fi.

The QR code 225 can be a quick-response code. The QR code 225 can be a two-dimensional bar code that can encode information and can be machine-readable. For example, the QR code 225 can consist of black squares arranged in a square grid on a non-black background (e.g., white, another non-black color, or clear) using four standardized encoding modes (numeric, alphanumeric, byte/binary, and kanji) to store data, which can be read or scanned by card reading devices having a camera and the application disclosed herein. The QR code 225 can be printed, burned, etched, engraved, embossed, painted, or otherwise placed on the layer 208. The QR code 225 can comprise private information. In some examples, other information can also be placed on the layer 208.

The marking 230 can include a provider designation, an identification of the card-issuing entity, such as a financial institution or other corporation, or a government entity, or other non-private information. The marking 230 can be printed, burned, etched, engraved, embossed, painted, or otherwise placed on the layer 206. In some examples, the marking 230 can be visible when the layer 206 is exposed to visible light.

The magnetic stripe 235 can comprise magnetic particles, such as one or more particles of ferromagnetic materials selected from the group of iron, nickel, steel, and cobalt, along with their respective oxides, particles of diamagnetic materials and paramagnetic materials can be used as the magnetic particle, or a magnetic tape, or any combination thereof. The magnetic stripe 235 can be encoded with data to facilitate communication with magnetic reading devices, such as magnetic swipe readers and other magnetic card readers. It is understood that, in some examples, the magnetic stripe 235 can be omitted as unnecessary or as insufficiently secure in view of the other features of the card 200.

In some examples, the layers 206 and 207 can be light-sensitive layers that conceal the QR code 225 when exposed to visible light. When exposed to non-visible light, such as UV light, IR light, or other radiation, such as radio waves, microwaves, and gamma rays, the layers 206 and 207 can reveal the QR code 225. In some examples, the non-visible light or radiation that causes the layer 206 to reveal the QR code 225 can also cause the layer 207 to reveal the QR code 225. In other examples, a different non-visible light or radiation than what causes the layer 206 to reveal the QR code 225 can be required to cause the layer 207 to reveal the QR code 225.

Information, such as private information, can also be placed on the side of the layer 208 facing the layers 209 and 210. In some examples, the layers 209 and 210 can be light-sensitive layers that conceal this information when exposed to visible light. When exposed to non-visible light, such as UV light, IR light, or other radiation, such as radio waves, microwaves, and gamma rays, the layers 209 and 210 can reveal this information. In some examples, the non-visible light or radiation that causes the layer 209 to reveal this information can also cause the layer 210 to reveal this information. In other examples, a different non-visible light or radiation than what causes the layer 209 to reveal this information can be required to cause the layer 210 to reveal this information.

In some examples, the layers 206, 207, 209, and 210 can be formed of the same light-sensitive material or the same combination of light-sensitive materials. In some examples, the layers 206 and 207 can be formed of the same light-sensitive material or the same combination of light-sensitive materials and the layers 209 and 210 can be formed of the same light-sensitive material or the same combination of light-sensitive materials, but the light-sensitive materials forming the layers 206 and 207 can be different from the light-sensitive materials forming the layers 209 and 210. In some examples, the layers 206 and 209 can be formed of the same light-sensitive material or the same combination of light-sensitive materials and the layers 207 and 210 can be formed of the same light-sensitive material or the same combination of light-sensitive materials, but the light-sensitive materials forming the layers 206 and 209 can be different from the light-sensitive materials forming the layers 207 and 210. In some examples, the layers 206 and 210 can be formed of the same light-sensitive material or the same combination of light-sensitive materials and the layers 207 and 209 can be formed of the same light-sensitive material or the same combination of light-sensitive materials, but the light-sensitive materials forming the layers 206 and 210 can be different from the light-sensitive materials forming the layers 207 and 209. In some examples, each of the layers 206, 207, 209, and 210 can be formed of a different light-sensitive material or a different combination of light-sensitive materials.

Figure 2B:
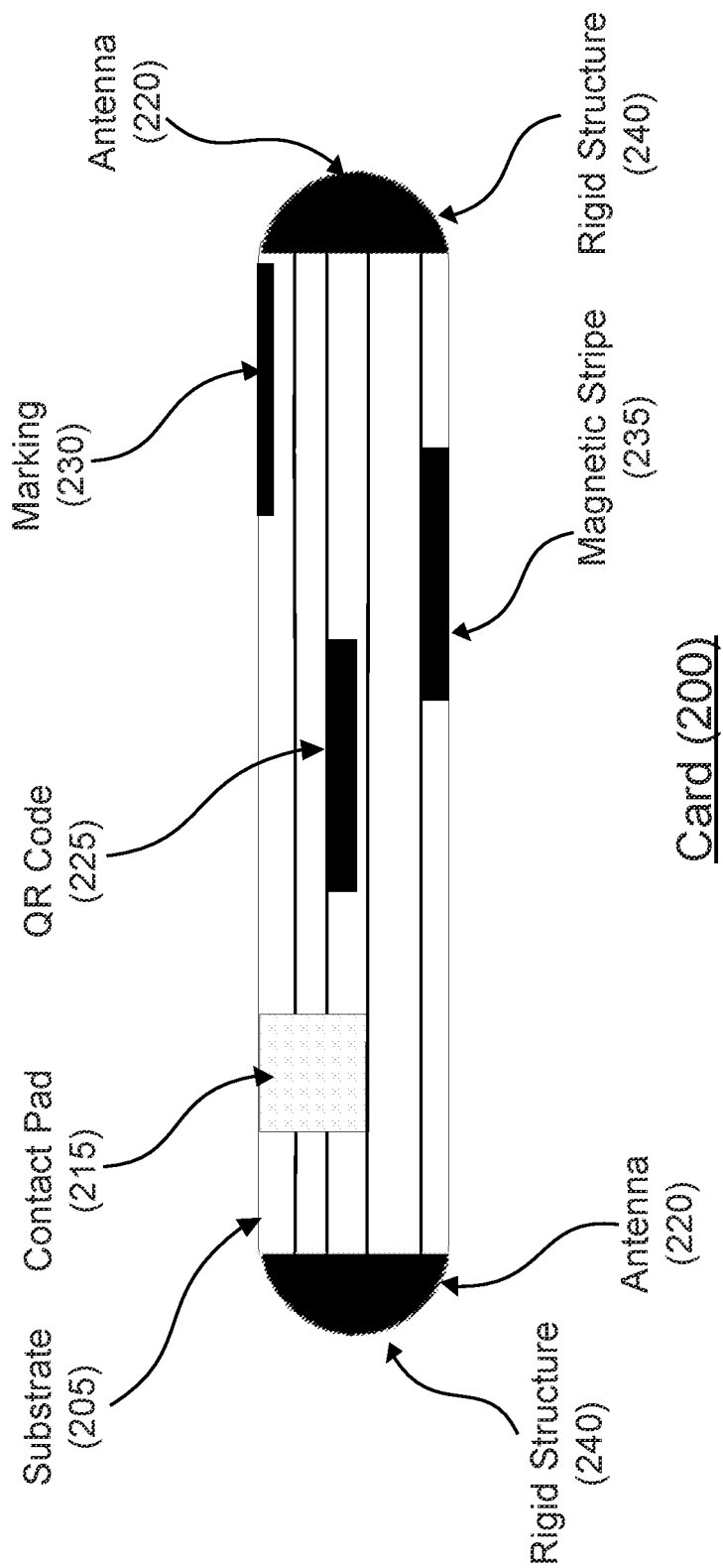
FIG. 2B is an illustration of a card according to an example embodiment.

FIG. 2B illustrates a side view of an example embodiment of card 200. FIG. 2B can reference the same or similar components as illustrated in FIG. 2A as described herein but is not limited thereto.

As shown in FIG. 2A, the card 200 can include a substrate 205 a plurality of layers 206, 207, 208, 209, and 210, a contact pad 215, a QR code 225, a marking 230, a magnetic stripe 235, and a rigid structure 240 containing the antenna 220. The plurality of layers 206, 207, 208, 209, and 210 can comprise a plurality of light-sensitive layers and non-light-sensitive layers.

The layers 206, 207, 209, and 210 can be light-sensitive layers comprising light-sensitive materials. Exemplary light-sensitive materials include, without limitation, plastics, ceramics, glasses, coated or doped materials, UV or IR transparent compounds, and radiopaque fillers, and any combination thereof. Exemplary light-sensitive materials can include, without limitation, materials, such as plastics, ceramics, or glass, coated or doped with metal oxides (e.g., titanium dioxide, zinc oxide), radiopaque fillers (e.g., barium sulfate), UV or IR transparent compounds (e.g., acrylic, silicon, quartz, barium fluoride, potassium bromide, cadmium telluride, gallium arsenide, IR or UV grade fused silica, schott glass, IR plastic), and any combination thereof.

The layer 208 can be a non-light-sensitive layer comprising non-light-sensitive materials. Exemplary non-light-sensitive layer include, without limitation, polyvinyl chloride, polyvinyl chloride acetate, acrylonitrile butadiene styrene, polycarbonate, polyesters, anodized titanium, palladium, gold, carbon, paper, biodegradable materials, and any combination thereof.

The contact pad 215 can be embedded in substrate 205, for example, in one or more of the light-sensitive layers and/or in one or more of the non-light-sensitive layers. As shown in FIG. 2B, the contact pad 215 can be embedded in the layers 206, 207, and 208. The contact pad 215 can comprise a chip, processing circuitry, an antenna, and other components, and additional details on the contact pad are provided with reference to FIG. 2C.

The QR code 225 can be a quick-response code. The QR code 225 can be printed, burned, etched, engraved, embossed, painted, or otherwise placed on the layer 208. The QR code 225 can comprise private information. In some examples, other information can also be placed on the layer 208.

The marking 230 can include a provider designation, an identification of the card-issuing entity, such as a financial institution or other corporation, or a government entity, or other non-private information. The marking 230 can be printed, burned, etched, engraved, embossed, painted, or otherwise placed on the layer 206. In some examples, the marking 230 can be visible when the layer 206 is exposed to visible light.

The magnetic stripe 235 can comprise magnetic particles, particles of diamagnetic materials and paramagnetic materials can be used as the magnetic particle, a magnetic tape, or any combination thereof. The magnetic stripe 235 can be encoded with data to facilitate communication with magnetic reading devices, such as magnetic swipe readers and other magnetic card readers. It is understood that, in some examples, the magnetic stripe 235 can be omitted as unnecessary or as insufficiently secure in view of the other features of the card 200.

The rigid structure 240 can be composed of light-sensitive and/or non-light-sensitive materials and can be formed around a portion of, or the entirety of, the outer perimeter of the substrate 205. The rigid structure 240 can provide structural rigidity to the substrate 205. The rigid structure 240 can improve and maintain the integrity of the card 100 and across the one or more layers forming the substrate 205 during normal use and handling, including swiping and insertion of the card 100 into card reading devices.

As shown in FIG. 2B, the antenna 220 can be external to the contact pad 215 and the antenna 220 can be contained within a portion of, or throughout the entirety of, the rigid structure 220. The antenna 220 can support data communication and power harvesting with external devices via short-range wireless communications, such as near field communication, radio-frequency identification, Bluetooth®, and Wi-Fi. The rigid structure 240 can provide protection to the antenna 220 and further provide the antenna 220 with improve external communications ability for data communications and power harvesting.

Figure 2C:
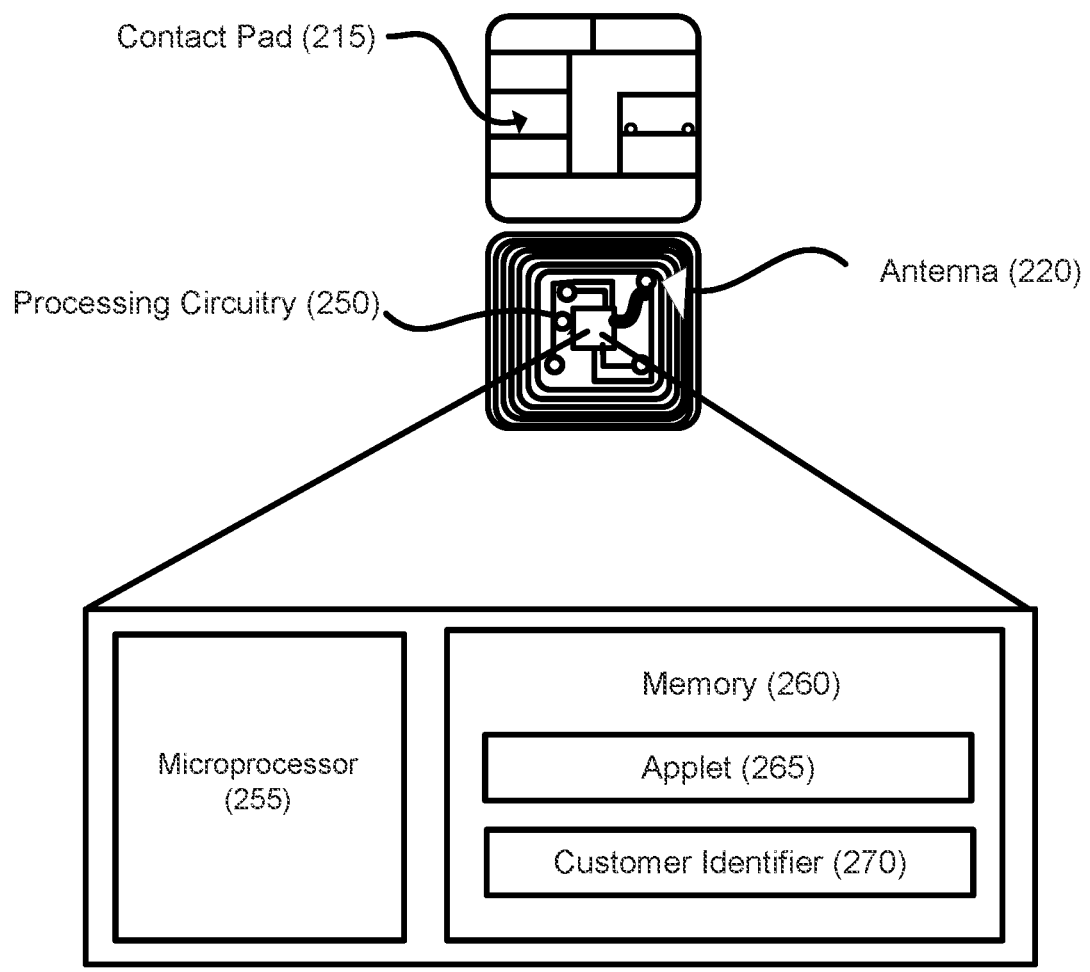
FIG. 2C is an illustration of a contact pad according to an example embodiment.

FIG. 2C illustrates a contact pad 215 according to an example embodiment. The contact pad 215 can be configured to establish contact with another communication device, such as a smart phone, laptop, desktop, tablet computer, a kiosk, or other device. FIG. 2C may reference the same or similar components of FIGS. 2A and 2B as described herein but is not limited thereto.

As shown in FIG. 2C, the contact pad 215 comprises the processing circuitry 250 and the antenna 220 located behind the contact pad 215. In other examples, such as the example embodiment illustrated in FIG. 2B, the antenna 220 can be electrically connected to, but separate from, the contact pad 215. In addition, the processing circuitry 250 can be located elsewhere within the card 200 other than behind the contact pad 200.

The processing circuitry 250 can store and process information, and can further compromise a microprocessor 255 and a memory 260. It is understood that the processing circuitry 250 may contain additional components, including processors, memories, error and parity/CRC checkers, data encoders, anticollision algorithms, controllers, command decoders, security primitives and tamperproofing hardware, as necessary to perform the functions described herein.

The memory 260 can be a read-only memory, write-once read-multiple memory or read/write memory, e.g., RAM, ROM, and EEPROM, and the card may include one or more of these memories. A read-only memory can be factory programmable as read-only or one-time programmable. One-time programmability provides the opportunity to write once then read many times. A write once/read-multiple memory can be programmed at a point in time after the memory has left the factory. Once the memory is programmed, it may not be rewritten, but it can be read many times. A read/write memory can be programmed and re-programed many times after leaving the factory. It may also be read many times.

The memory 260 can be configured to store one or more applets 265 and a customer identifier 270. The one or more applets 265 may comprise one or more software applications configured to execute on one or more cards, such as Java Card applet. However, it is understood that applets 265 are not limited to Java Card applets, and instead can be any software application operable on cards or other devices having limited memory. The customer identifier 270 may comprise a unique alphanumeric identifier assigned to a user of the card, and the identifier may distinguish the user of the card from other card users. In some examples, the customer identifier 270 may identify both a customer and an account assigned to that customer and may further identify the card associated with the customer's account.

The microprocessor 255 and memory 260 elements of the foregoing example embodiments are described with reference to the contact pad 215, but the present disclosure is not limited thereto. It is understood that these elements can be implemented outside of the contact pad 215 or entirely separate from it, or as further elements in addition to microprocessor 255 and memory 260 elements located within the contact pad 215.

In some examples, the card may comprise one or more antennas 220. The one or more antennas 220 can be placed within the card and around the processing circuitry 250 of the contact pad 215. In the example of FIG. 2C, the antenna 220 is shown as integral to the contact pad 215. However, it is understood that in other examples, the antenna 220 can be external to the contact pad. For example, the antenna 220 can be contained within a portion of, or throughout the entirety of, the rigid structure 240.

Figure 2D:
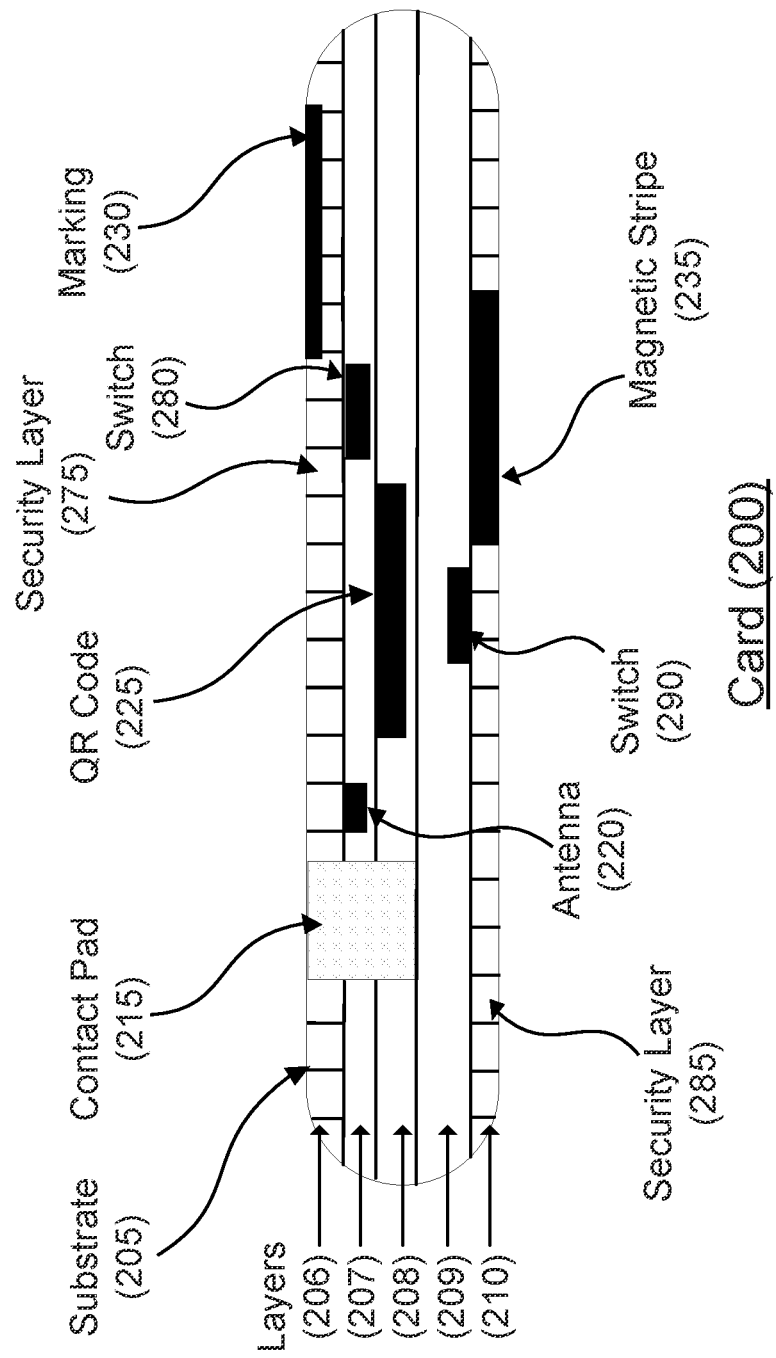
FIG. 2D is an illustration of a card according to an example embodiment.

FIG. 2D illustrates a side view of an example embodiment of card 200. FIG. 2D can reference the same or similar components as illustrated in FIGS. 2A-2C as described herein but is not limited thereto.

As shown in FIG. 2D, the card 200 can include a substrate 205 a plurality of layers 206, 207, 208, 209, and 210, a contact pad 215, an antenna 220, a QR code 225, a marking 230, a magnetic stripe 235, a first security layer 275, a first switch 280, a second security layer 285, and a second switch 290. The plurality of layers 206, 207, 208, 209, and 210 can comprise a plurality of light-sensitive layers and non-light-sensitive layers.

The first security layer 275 can be disposed upon and/or within the layer 206. The first security layer 275 can be composed of a plurality of opaque segments. In some examples, the plurality of segments can comprise a non-light-sensitive material that can obscure the layers, or the information placed thereon, underlying the first security layer 275. In other examples, the plurality of segments can have a varying opacity and be configured to obscure some or all of the layers, or the information placed thereon, underlying the first security layer 275. In some examples, the plurality of segments can be completely opaque, transparent, or translucent, and reveal the private information either completely or to a varying degree. In some examples, the opacity of the plurality of segments can vary based on the one or more of the underlying layers (e.g., the thickness of the underlying layers, the type and degree of light-sensitivity of the underlying layers), the nature of the information placed on the underlying layers (e.g., private information), and the method of placing the information on the underlying layers (e.g., printing, burning, painting, embossing, engraving, size of the information, the relative contrast between the information and the layers).

In some examples, the first security layer 275 can be coupled to first switch 280. The first switch 280 can move the plurality of segments between a first orientation and a second orientation. For example, the first orientation can allow light to pass through the plurality of segments to reach the underlying layers, and the first orientation can be used when the card is to be placed within a card reader or otherwise observed. As another example, the second orientation can preclude light from passing through the plurality of segments to reach the underlying layers, and the second orientation can be used when the card is not intended to be read or otherwise observed, or if increased security is required.

In some examples, the first switch 280 can be a physical switch, such as a button, lever, or knob, which can be manually adjusted by the user. In other examples, the first switch 280 can be in data communication with one or more external devices, such as card readers, servers, desktop computers, laptop computers, tablets, smartphones, kiosks, cash registers, automated teller machines, and other like computing devices. In response to a signal received from an external device, the first switch 280 can move the plurality of segments between the first orientation and the second orientation. For example, the signal can be sent from an application associated with the card, the card-issuing entity, the user, an account associated with the user, and/or one or more external devices. The signal can be sent for reasons including detection of potential fraud associated with the user, the user's account, and/or the card reader or other external device attempting to read or otherwise interact with the card, when a limit or threshold has been reached (e.g., a credit limit, a withdrawal limit), or in response to a report that the card has been lost or stolen.

The second security layer 285 can be disposed upon and/or within and the layer 210 to form a second security layer. The second security layer 285 can be disposed upon and/or within the layer 206. The second security layer 285 can be composed of a plurality of opaque segments. In some examples, the plurality of segments can comprise a non-light-sensitive material that can obscure the layers, or the information placed thereon, underlying the second security layer 285. In other examples, the plurality of segments can have a varying opacity and be configured to obscure some or all of the layers, or the information placed thereon, underlying the second security layer 285. In some examples, the plurality of segments can be completely opaque, transparent, or translucent, and reveal the private information either completely or to a varying degree. In some examples, the opacity of the plurality of segments can vary based on the one or more of the underlying layers (e.g., the thickness of the underlying layers, the type and degree of light-sensitivity of the underlying layers), the nature of the information placed on the underlying layers (e.g., private information), and the method of placing the information on the underlying layers (e.g., printing, burning, painting, embossing, engraving, size of the information, the relative contrast between the information and the layers).

In some examples, the second security layer 285 can be coupled to second switch 290. The second switch 290 can move the plurality of segments between a first orientation and a second orientation. For example, the first orientation can allow light to pass through the plurality of segments to reach the underlying layers, and the first orientation can be used when the card is to be placed within a card reader or otherwise observed. As another example, the second orientation can preclude light from passing through the plurality of segments to reach the underlying layers, and the second orientation can be used when the card is not intended to be read or otherwise observed, or if increased security is required.

In some examples, the second switch 290 can be a physical switch, such as a button, lever, or knob, which can be manually adjusted by the user. In other examples, the second switch 290 can be in data communication with one or more external devices, such as card readers, servers, desktop computers, laptop computers, tablets, smartphones, kiosks, cash registers, automated teller machines, and other like computing devices. In response to a signal received from an external device, the second switch 290 can move the plurality of segments between the first orientation and the second orientation. For example, the signal can be sent from an application associated with the card, the card-issuing entity, the user, an account associated with the user, and/or one or more external devices. The signal can be sent for reasons including detection of potential fraud associated with the user, the user's account, and/or the card reader or other external device attempting to read or otherwise interact with the card, when a limit or threshold has been reached (e.g., a credit limit, a withdrawal limit), in response to a report that the card has been lost or stolen, or upon scanning or processing information from the card.

As shown in FIG. 2D, the card 100 can comprise a first switch 280 associated with a first security layer 275 and a second switch 290 associated with a second security layer 285. In some examples, the first switch 280 and second switch 290 can be operated independently, such as in response to independent manual adjustment by the user or in response to separate signals from external devices. In other examples, the first switch 280 and the second switch 290 can be operated in concert with each other, such both the first switch 280 and the second switch 290 move the first and second security layers 275 and 285 to the same orientations at the same time. In other examples, only one switch can be provided and the one switch can move the first and second security layers 275 and 285.

In the example embodiment of FIG. 2D, the plurality of segments of the first security layer 275 and the plurality of segments of the second security layer 285 are in the first orientation. Accordingly, since the plurality of segments of the first security layer 275 and the plurality of segments of the second security layer 285 are in the first orientation, light can pass through the plurality of segments to reach the underlying layers.

Figure 2E:
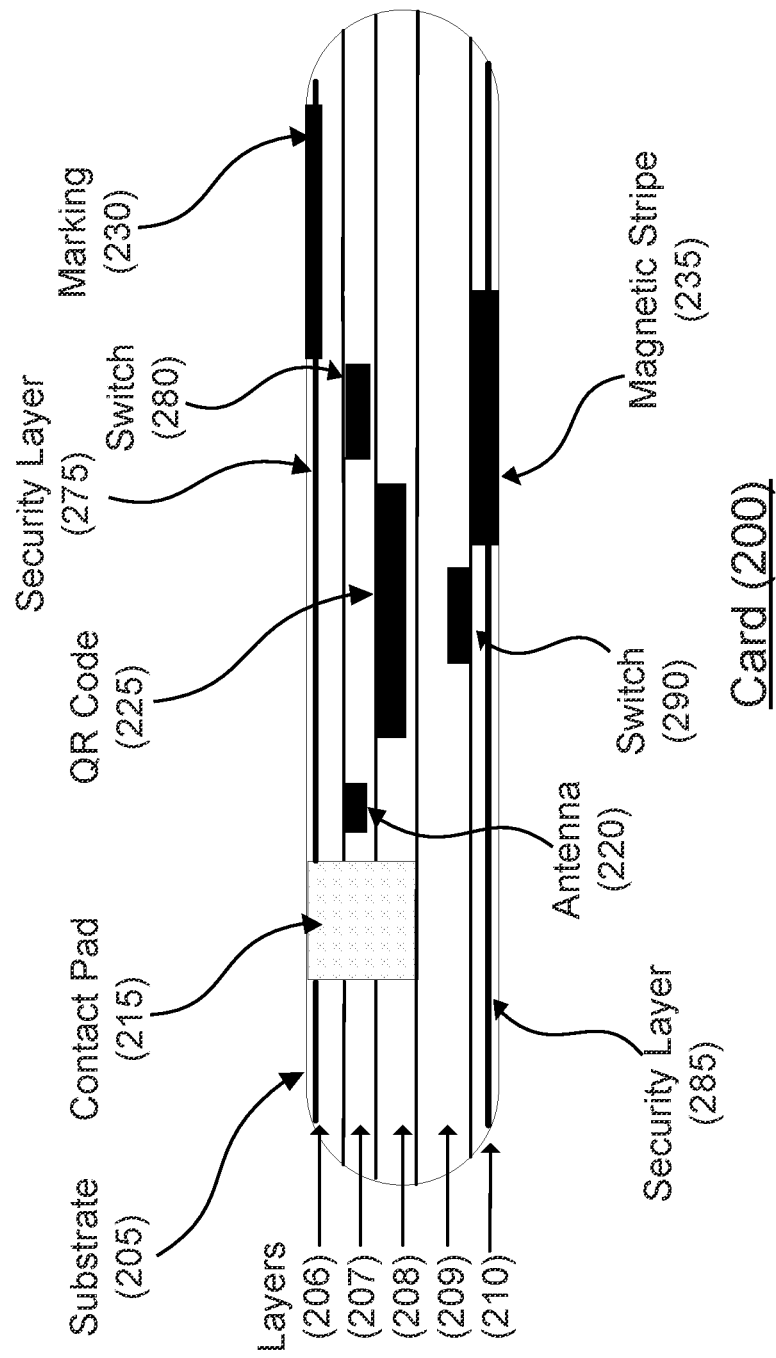
FIG. 2E is an illustration of a card according to an example embodiment.

FIG. 2E illustrates a side view of an example embodiment of card 200. FIG. 2E can reference the same or similar components as illustrated in FIGS. 2A-2D as described herein but is not limited thereto.

As shown in FIG. 2E, the card 200 can include a substrate 205 a plurality of layers 206, 207, 208, 209, and 210, a contact pad 215, an antenna 220, a QR code 225, a marking 230, a magnetic stripe 235, a first security layer 275, a first switch 280, a second security layer 285, and a second switch 290. The plurality of layers 206, 207, 208, 209, and 210 can comprise a plurality of light-sensitive layers and non-light-sensitive layers.

In the example embodiment of FIG. 2E, the plurality of segments of the first security layer 275 and the plurality of segments of the second security layer 285 are in the second orientation. Accordingly, since the plurality of segments of the first security layer 275 and the plurality of segments of the second security layer 285 are in the second orientation, light cannot pass through the plurality of segments to reach the underlying layers.

FIG. 3A illustrates a card reader 300 according to an example embodiment. FIG. 3A can reference the same or similar components as FIGS. 1A-1C and 2A-2E, however, FIG. 3A is not limited thereto.

As shown in FIG. 3A, the card reader 300 can include a reading element 305 including a microprocessor 310, a memory 315, a communications interface 320, a light source 325, and a scanner 330. The card reader 300 can further include a side screen 335 and a side screen 340.

The reading element 305 can operate to read the card by providing the necessary non-visible light or other radiation to reveal information concealed by one or more light-sensitive layers of the card. Once revealed, the reading element can capture the revealed information. The reading element 305 can include the microprocessor 310, which can include processing circuitry and additional components, including processors, memories, error and parity/CRC checkers, data encoders, anticollision algorithms, controllers, command decoders, security primitives and tamper-proofing hardware, as necessary to perform the functions described herein.

The reading element 305 can include the memory 315, and the memory 315 can be a read-only memory, write-once read-multiple memory or read/write memory, e.g., RAM, ROM, and EEPROM, and the reading element 305 may include one or more of these memories. The memory 315 can be configured to store one or more software applications and/or applets.

The reading element 305 can contain a communications interface 320, which can be configured to facilitate wired and/or wireless communication. The communications interface 320 can be configured to facilitate communication between the card reader 300 and external devices, such as servers, desktop computers, laptop computers, tablets, smartphones, kiosks, cash registers, automated teller machines, and other like computing devices. The communications interface 320 can be configured to communicate via one or more of a wireless network, a wired network, or any combination of wireless network and wired network, including one or more of a fiber optics network, a passive optical network, a cable network, an Internet network, a satellite network, a wireless local area network (LAN), a Global System for Mobile Communication, a Personal Communication Service, a Personal Area Network, a Wireless Personal Area Network, a Wide Body Area Network, Wireless Application Protocol, Multimedia Messaging Service, Enhanced Messaging Service, Short Message Service, Time Division Multiplexing based systems, Code Division Multiple Access based systems, IEEE Ethernet 902.3, D-AMPS, Wi-Fi, Fixed Wireless Data, IEEE 802.11b, 802.15.1, 802.11n and 802.11g, near field communication, radio-frequency identification, Bluetooth®, and/or the like. In some examples, the communications interface 320 can be configured to connect the card reader 300 to the Internet.

The reading element 305 can contain the light source 325 that can generate non-visible light, such as UV light, IR light, or other radiation, such as radio waves, microwaves, and gamma rays, and project the non-visible light or other radiation on the light-sensitive layers of the card. In some examples, the non-visible light or other radiation can be applied directly on the light-sensitive layers of the card, applied via strobe lighting, and/or applied via backlighting. By doing so, the light source 325 can cause information underneath the light-sensitive layers of the card to be revealed. The light source 325 can be configured to project and direct non-visible light or other radiation based on the characteristics of the light-sensitive layers of one or more particular cards, in order to adequately reveal the underlying information (e.g., a quick response code, an account number). For example, the light source 310 can be configured to direct a concentrated UV light on the light-sensitive layers of the card.

The reading element 305 can further contain a scanner 330 configured to capture the information that is revealed by the application of non-visible light or other radiation by the light source 325 on the light-sensitive layers of the card. The scanner 315 can be an optical scanner, a camera, or other type of data capture or image capture device or sensor configured to capture the information underlying the light-sensitive layers.

The card reader 300 can include a side screen 335 and a side screen 340, which function to shield the card from observation when the card is placed within the card reader 300. As shown in FIG. 3A, the side screen 335 and side screen 340 can be disposed on either side of reading element 305, however, the side screen 3335 and side screen 340 can be disposed in other ways (e.g., above and below the reading element 305, encompassing the reading element 305) based on the configuration of the card reader 300 and its surrounding environment as is necessary to shield the card during the use of the card reader 300. The side screen 335 and the side screen 340 can be composed of non-light-sensitive materials and be of sufficient dimensions to adequately shield the card. While FIG. 3A shows the side screen 335 and the side screen 340, it is understood that the card reader 300 can include as many side screens as is necessary to adequately shield the card.

Figure 3B:
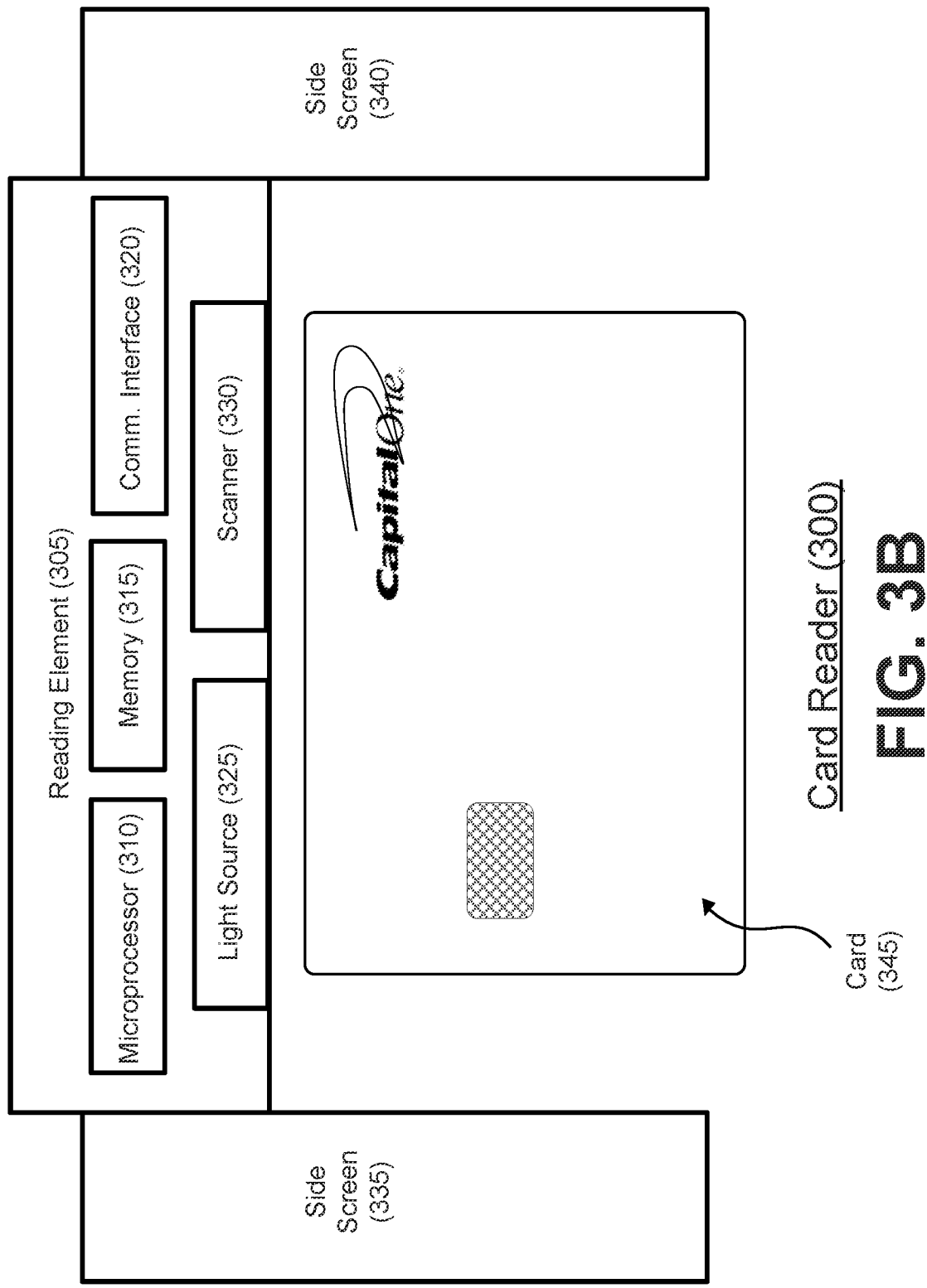
FIG. 3B is an illustration of a card reader according to an example embodiment.

FIG. 3B illustrates a card reader 300 according to an example embodiment. FIG. 3B may reference the same or similar components as FIG. 3A, however, FIG. 3B is not limited thereto.

As shown in FIG. 3B, the card reader 300 can include a reading element 305 including a microprocessor 310, a memory 315, a communications interface 320, a light source 325, and a scanner 330. The card reader 300 can further include a side screen 335 and a side screen 340.

FIG. 3B further illustrates a card 345, which can be the same or similar as the cards referenced in FIGS. 1A-1C and 2A-2E however, the card 345 is not limited thereto. The card 345 can comprise a substrate comprising one or more light-sensitive layers and one or more non-light-sensitive layers underlying the one or more light-sensitive layers, and information, such as private information, can be placed on at least one of the one or more non-light-sensitive layers.

As shown in FIG. 3B, the card 345 has been inserted or otherwise placed within the card reader 300. No light or other radiation has been generated by the light source 325 and directed on the card 345, and accordingly the light-sensitive layers of the card 345 have not revealed the information underlying these layers.

Figure 3C:
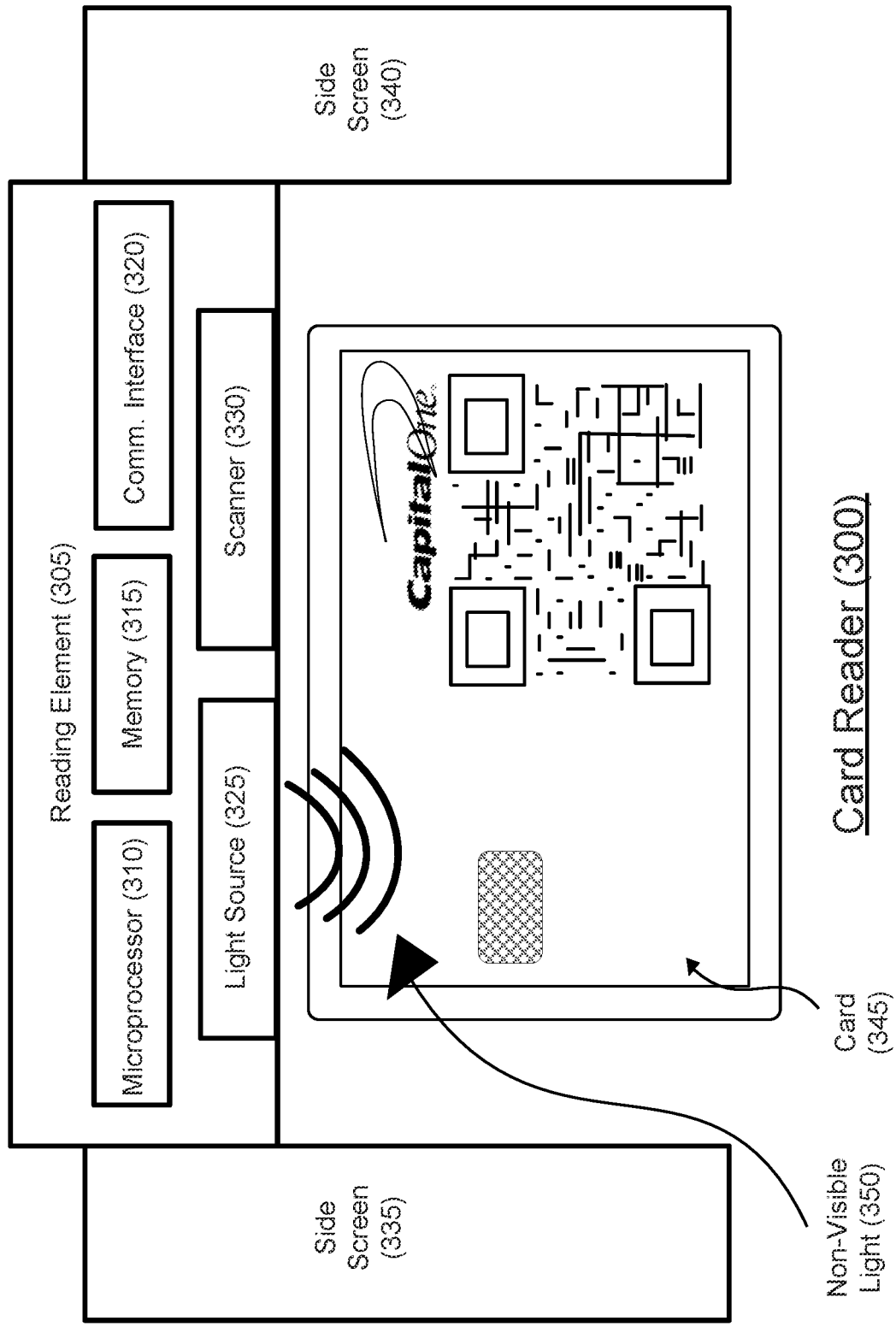
FIG. 3C is an illustration of a card reader according to an example embodiment.

FIG. 3C illustrates a card reader 300 according to an example embodiment. FIG. 3C may reference the same or similar components as FIGS. 3A and 3B, however, FIG. 3C is not limited thereto.

As shown in FIG. 3C, the card reader 300 can include a reading element 305 including a microprocessor 310, a memory 315, a communications interface 320, a light source 325, and a scanner 330. The card reader 300 can further include a side screen 335 and a side screen 340.

FIG. 3C further illustrates a card 345, which can be the same or similar as the cards referenced in FIGS. 1A-1C and 2A-2E, however, the card 345 is not limited thereto. The card 345 can comprise a substrate comprising one or more light-sensitive layers and one or more non-light-sensitive layers underlying the one or more light-sensitive layers, and information, such as private information, can be placed on at least one of the one or more non-light-sensitive layers.

As shown in FIG. 3C, the card 345 has been inserted or otherwise placed within the card reader 300. Non-visible light 350 (or other radiation) has been generated by the light source 325 and directed on the card 345. In some examples, the non-visible light or other radiation can be applied directly on the light-sensitive layers of the card, applied via strobe lighting, and/or applied via backlighting. Accordingly the light-sensitive layers of the card 345 have revealed the information underlying these layers (a quick response code as shown in FIG. 3C). The scanner 330 can capture the revealed information and provide the information to the microprocessor 310, memory 315, and communications interface 320 for analysis, storage, transmission, and/or use in one or more transactions.

Figure 4:
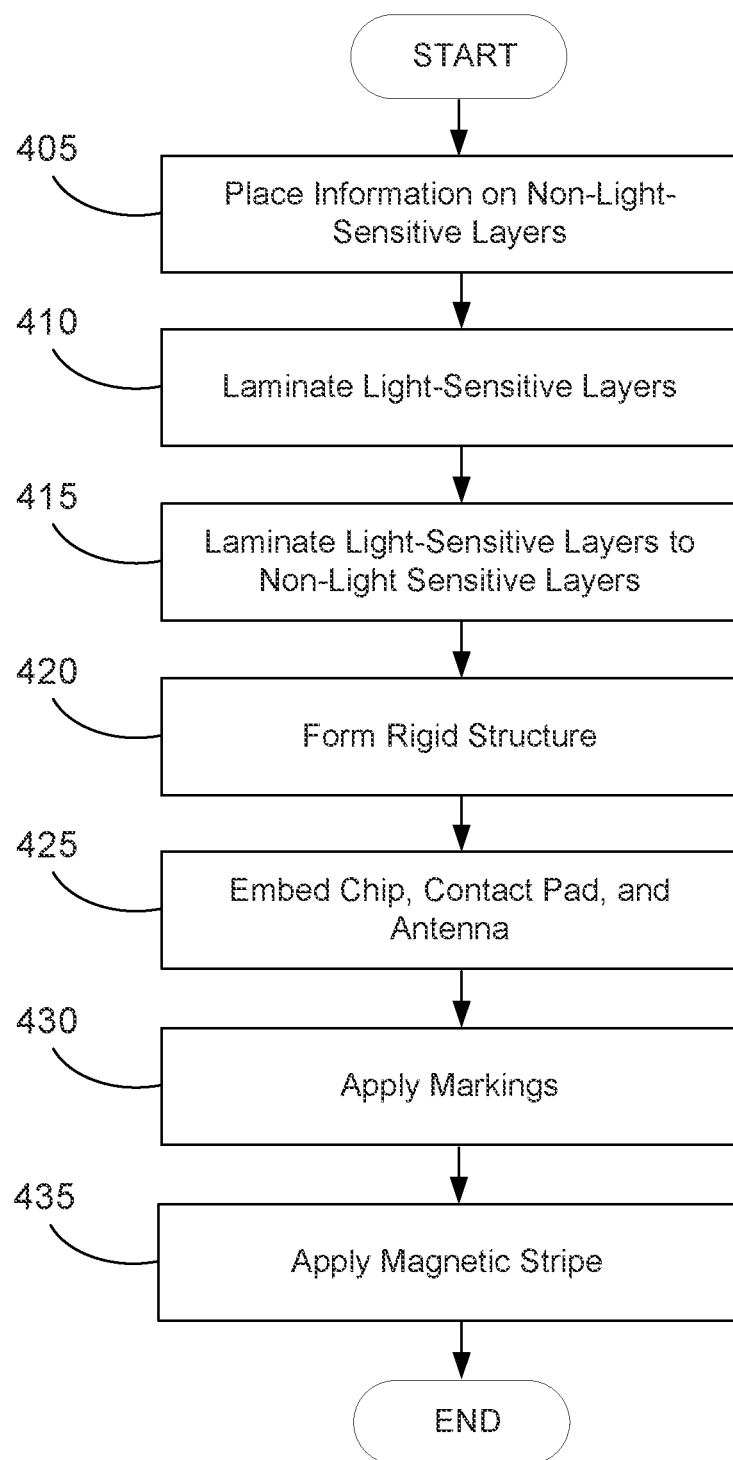
FIG. 4 is an illustration of a method of fabricating a card according to an example embodiment.

FIG. 4 illustrates a method 400 of fabricating a card according to an example embodiment. FIG. 4 may reference the same or similar components of FIGS. 1A-1C, 2A-2E, and 3A-3C, however, FIG. 4 is not limited thereto. In this example embodiment, the card comprises one or more light-sensitive layers and one or more non-light-sensitive layers affixed on either side of the one or more non-light-sensitive layers.

The method 400 can commence in step 405, where information, such as private information, can be placed on one or more non-light-sensitive layers. This information can be printed, burned, etched, engraved, embossed, painted, or otherwise placed on the one or more non-light-sensitive layers.

In step 410, the one or more light-sensitive layers can be laminated or otherwise affixed together to function as a unitary element. This can be accomplished through the use of a laminating press or other tool.

In step 415, the one or more laminated light-sensitive layers can be laminated or otherwise affixed to the one or more non-light-sensitive layers. This can be accomplished through the use of a laminating press or other tool. The one or more light-sensitive layers can be placed only one side of the one or more non-light-sensitive layers or alternatively at least one of the one or more light-sensitive layers can be placed on opposite sides of the one or more non-light-sensitive layers. In either case, the one or more light-sensitive layers can be laminated or otherwise affixed together with the one or more non-light-sensitive layers to function as a unitary element.

In step 420, the rigid structure can be formed. The rigid structure can be composed of light-sensitive and/or non-light-sensitive materials and can be formed by inserting additional materials into the one or more light-sensitive and/or one or more non-light-sensitive layers. This can be accomplished by lamination or other process suitable to forming the rigid structure. The rigid structure can be formed around a portion of, or the entirety of, the outer perimeter of the one or more light-sensitive and/or one or more non-light-sensitive layers.

In step 425, the chip, the contact pad, and the antenna can be embedded within the unitary one or more light-sensitive layers and one or more non-light-sensitive layers. A pocket for placement of the chip, the contact pad, and the antenna can be formed within the one or more light-sensitive and/or the one or more non-light-sensitive layers, and the chip, the contact pad, and the antenna can be placed within the pocket. The pocket can be formed by milling, drilling, and/or cutting the one or more light-sensitive and/or the one or more non-light-sensitive layers, or by laminating one or more light-sensitive and/or one or more non-light-sensitive layers specifically shaped to accommodate the chip pocket. The chip, the contact pad, and the antenna can be held in place by the tightness of fit within the pocket, adhesives, the replacement of portions of the one or more light-sensitive layers and the one or more non-light-sensitive layers, and/or other method of adherence. In some examples, where the chip, the contact pad, and the antenna can be placed within one pocket, and in other examples the chip, the contact pad, and the antenna can be placed in separate pockets at varying levels within the one or more light-sensitive layers and the one or more non-light-sensitive layers. In some examples, the antenna can be placed with a portion of, or the entirety of, the rigid structure.

In step 430, markings, such as non-private information, can be applied to the outermost light-sensitive layers on either side of the one or more non-light-sensitive layers. This markings can be applied by printing, burning, etching, engraving, embossing, painting, or otherwise methods of placing the markings.

In step 435, a magnetic stripe can be formed in the one or more light-sensitive layers and/or the one or more non-light-sensitive layers. The magnetic stripe can be formed using a roller, by one or more printing methods, such as transfer printing, or by the application of a tape bearing magnetic particles. Once formed, the magnetic stripe can also be encoded with data. It is understood that, in some examples, the magnetic stripe can be omitted as unnecessary or as insufficiently secure in view of the other features of the card.

Figure 5:
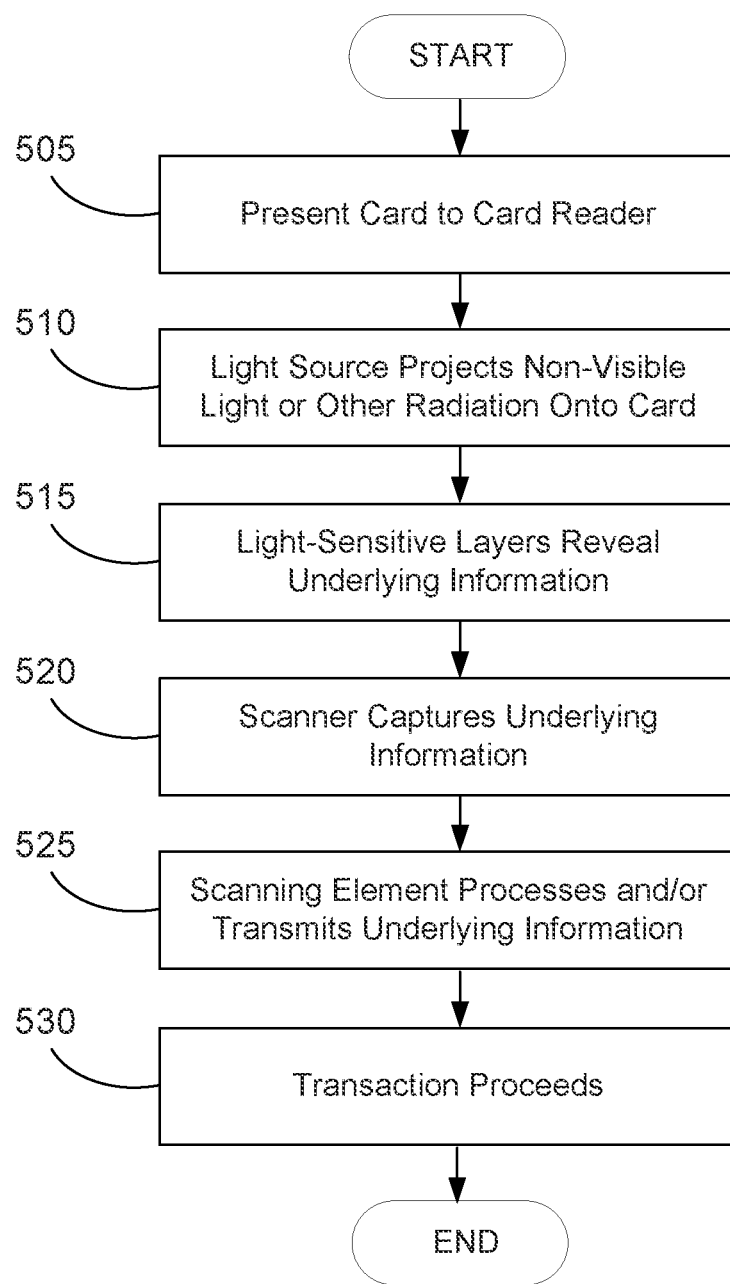
FIG. 5 is an illustration of a method of using a card according to an example embodiment.

FIG. 5 illustrates a method 500 of using a card according to an example embodiment. FIG. 5 may reference the same or similar components of FIGS. 1A-1C, 2A-2E, 3A-3C, and 4, however, FIG. 5 is not limited thereto.

The method 500 can commence in step 505, where a card can be presented to the card reader in a way that is accessible to the scanning element. In some examples, the card can be placed between and/or into one or more side screens. In other examples, the card can be inserted into a slot or other opening. The card should be positioned to be sufficiently accessible to the scanning element so that the subsequent steps of the method 500 can be performed.

In step 510, the light source can generate and direct non-visible light, such as UV light, IR light, or other radiation, such as radio waves, microwaves, and gamma rays, onto the card. In some examples, the non-visible light or other radiation can be applied directly on the light-sensitive layers of the card, applied via strobe lighting, and/or applied via backlighting. When the non-visible light or other radiation light strikes the one or more light-sensitive layers within the card, in step 515 the one or more light-sensitive layers can reveal information, such as private information, placed on the one or more underlying non-light-sensitive layers.

Once the information placed on the one or more underlying non-light-sensitive layers is revealed, the scanner can capture this information in step 520. The scanner can an optical scanner, a camera, or other type of data capture or image capture device or sensor configured to capture the information underlying the light-sensitive layers.

In step 525, the scanning element, which can include a microprocessor, a memory, and a communications interface, can process and/or transmit the information. This scanning element can process the information for analysis and depending upon the particular information, this can include identifying a quick response code, an account number, or text, performing natural language processing, or other processes. The scanning element can store the information in the memory and can transmit, via the communications interface, the information to one or more external devices, such as servers, desktop computers, laptop computers, tablets, smartphones, kiosks, cash registers, automated teller machines, and other like computing devices.

In step 530, using the information, a transaction can proceed and/or can be completed.

As used herein, the term "card" is not limited to a particular type of card. Rather, it is understood that the term "card" can refer to a contact-based card, a contactless card, or any other card, unless otherwise indicated. It is further understood that the present disclosure is not limited to cards having a certain purpose (e.g., payment cards, gift cards, identification cards, or membership cards), to cards associated with a particular type of account (e.g., a credit account, a debit account, a membership account), or to cards issued by a particular entity (e.g., a financial institution, a government entity, or a social club). Instead, it is understood that the present disclosure includes cards having any purpose, account association, or issuing entity.

As used herein, the term "private information" is not limited to a particular type of information. Rather, it is understood that the term "private information" can refer to information that has value, information that is intended to be kept private or semi-private, or information that is only intended to be reveal to certain entities or in certain circumstances. Examples of private information include, without limitation, account information (e.g., account balances, account activity, transaction histories), account, entity, or user identifiers (e.g., account numbers, expiration dates, names, addresses, signatures, pictures, telephone numbers, birth dates, social security numbers, passport numbers, driver's license number), authenticity and security features (e.g., card verification values, card security codes, passwords, personal identification numbers (PINs), one-time passcodes, holograms, security images, biometric data), machine-readable codes (e.g., bar codes, QR codes), personal information (e.g., academic information, financial information, medical information), and any combination thereof.

As used herein, the term "merchant" can include, without limitation, retail merchants and vendors. However, it is understood that the term "merchant" is not limited thereto, and that the present disclosure can include any type of merchant, vendor, or other entity involving in activities where products or services are sold or otherwise provided, either online, in a physical location, or both.

As used herein, the term "card-issuing entity" can include, without limitation, financial institutions. However, it is understood that the term "card-issuing entity" is not limited thereto, and the present disclosure can include corporations, state, local, and federal governments, and any other entity issuing cards for use in transaction.

As used herein, the term "transaction" can include, without limitation, financial transactions. However, it is understood that the term "transaction" is not limited thereto, and the present disclosure can include financial transactions, identity verification transactions, area access transactions, user authentication transactions, membership verification transactions, eligibility verification transactions, a card activation, and any other operation involving a card.

Throughout the specification, reference is made to a "QR code," however, the present disclosure is not limited thereto. It is understood that the code can be at least one selected from the group of a quick response code, a linear barcode, a matrix barcode, a code 11 barcode, a code 39 barcode, a code 93 barcode, a code 128 barcode, a PDF147 barcode, an interleaved 2 of 5 barcode, a codabar, a Universal Product Code barcode, and an image.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device).

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A card, comprising:
 a substrate comprising a first layer, a second layer, and a third layer, wherein the second layer is disposed between the first layer and the third layer;
 a chip embedded in the second layer;
 a quick-response (QR) code formed on the second layer;
 a first opaque security layer disposed upon the first layer; and
 a second opaque security layer disposed upon the third layer,
 wherein:
  the first layer comprises a first material that is transparent when exposed to a non-visible light,
  the second layer comprises a second material that is opaque when exposed to visible light and when exposed to non-visible light,
  the third layer comprises a third material that is transparent when exposed to a non-visible light, and
  the first opaque security layer and the second opaque security layer comprise:
   one or more opaque segments having a first orientation and a second orientation, and
   a switch configured to move the one or more segments between the first orientation and the second orientation.

2. The card of claim 1, further comprising a magnetic stripe formed on the third layer.

3. The card of claim 1, further comprising a rigid structure formed around a perimeter of the substrate.

4. The card of claim 3, further comprising an antenna embedded within the rigid structure.

5. The card of claim 4, wherein the chip is in data communication with the antenna.

6. The card of claim 1, wherein the non-visible light comprises a concentrated ultraviolet (UV) light.

7. The card of claim 1, wherein the non-visible light comprises black light.

8. The card of claim 1, wherein the non-visible light exposed via strobe lighting.

9. The card of claim 1, wherein:
the switch is in data communication with an application executing on a first device, and
the switch is configured to move the one or more segments between the first orientation and the second orientation in response to a signal received from the application.

10. The card of claim 9, wherein the application is configured to:
scan the QR code, and
communicate with a server in response to the scanned QR code.

11. The card of claim 1, wherein the first material and the third material are the same material.

12. The card of claim 1, wherein the first material has a different opacity than the third material.

13. A method of fabricating a card, comprising:
laminating a first layer onto a first side of a second layer;
embedding a chip within the first layer and the second layer;
laminating a third layer onto a second side of the second layer, wherein the second side of the second layer is opposite of the first side;
forming a first opaque security layer upon the first layer; and
forming a second opaque security layer upon the third layer,
wherein:
the first layer comprises a first material that is transparent when exposed to a non-visible light,
the second layer comprises a second material that is opaque when exposed to visible light and when exposed to non-visible light,
the third layer comprises a first material that is transparent when exposed to a non-visible light, and
the first opaque security layer and the second opaque security layer comprise:
one or more opaque segments having a first orientation and a second orientation, and
a switch configured to move the one or more segments between the first orientation and the second orientation.

14. The method of claim 13, further comprising forming a quick response (QR) code on a first side of the second layer.

15. The method of claim 14, wherein the QR code comprises account information for an account associated with the card.

16. The method of claim 14, further comprising embedding an antenna around a perimeter of the first layer.

17. The method of claim 16, wherein the antenna is embedded within a rigid structure.

18. A card, comprising:
a substrate comprising a first layer, a second layer, and a third layer, wherein the second layer is disposed between the first layer and the third layer;
a chip embedded in the second layer;
a quick-response (QR) code formed on the second layer;
a first opaque security layer disposed upon the first layer; and
a second opaque security layer disposed upon the third layer,
wherein:
the first layer comprises a first material that is transparent when exposed to a non-visible light,
the substrate layer comprises a second material that is opaque when exposed to visible light and when exposed to non-visible light,
the third layer comprises a third material that is transparent when exposed to a non-visible light, and
the first opaque security layer and the second opaque security layer comprise:
one or more opaque segments having a first orientation and a second orientation, and
a switch configured to move the one or more segments between the first orientation and the second orientation.

19. The card of claim 18, wherein the one or more opaque segments have a varying opacity.

20. The card of claim 18, wherein:
the first orientation permits visible light to pass through the first opaque security layer and the second opaque security layer, and
the second orientation precludes visible light from passing through the first opaque security layer and the second opaque security layer.

* * * * *